Jan. 31, 1939.  N. E. GEE  2,145,542
FLEXIBLE DRIVE
Filed Oct. 22, 1936    2 Sheets-Sheet 2
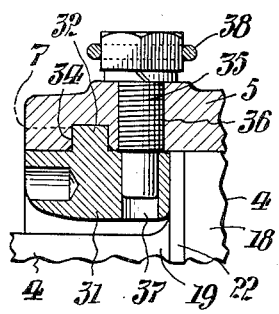
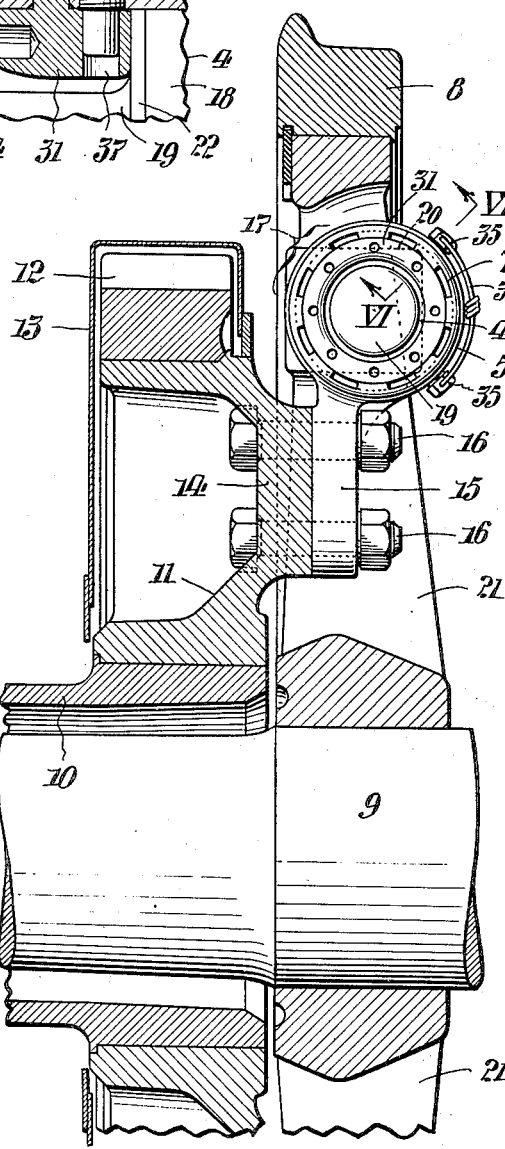
INVENTOR:
Norman E. Gee,
BY Fraley & Paul
ATTORNEYS.

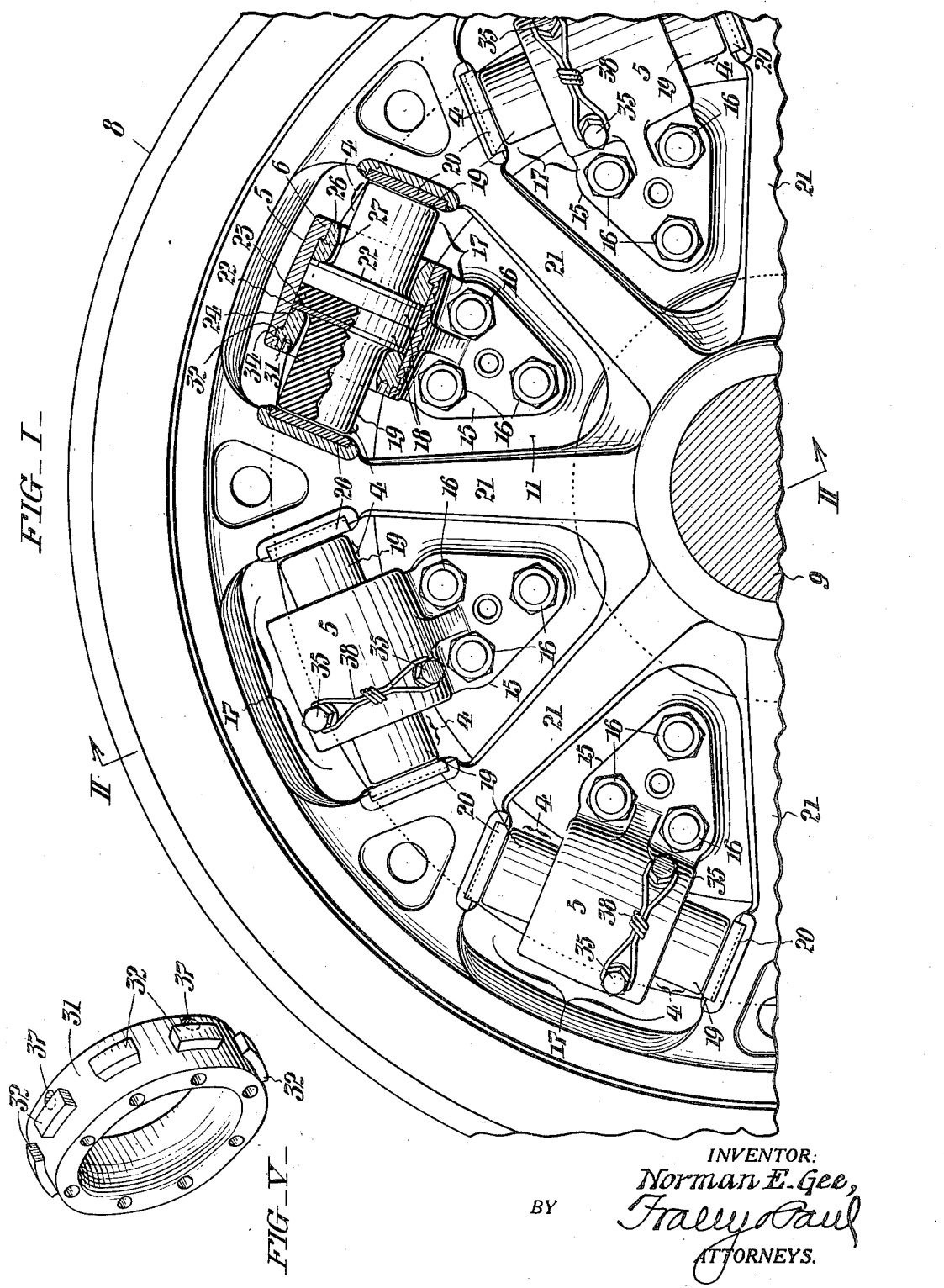

Patented Jan. 31, 1939

2,145,542

UNITED STATES PATENT OFFICE 2,145,542

FLEXIBLE DRIVE

Norman E. Gee, Altoona, Pa.

Application October 22, 1936, Serial No. 107,022

6 Claims. (Cl. 64—27)

This invention relates to a flexible drive and has special application to quill drives of the type used on electric locomotives for transmitting the torque of a driving motor to the locomotive driving wheels.

A primary object of the invention is to provide a flexible drive which is characterized by simplicity of construction, low cost of manufacture, and ease of assembly and which is nevertheless durable and capable of efficient operation over a long period of time.

Another object of the invention is to provide a drive unit, used for flexibly connecting the driving and driven members, which comprises counterpart rubber elements disposed in axial alignment and with their free ends engaging surfaces on the wheel to be driven.

A further object of the invention is to provide means for holding such resilient drive units within an opening in the wheel to be driven, together with means for adjusting the position of said units, as wear occurs to compensate for such wear.

Other objects and advantages characteristic of my invention will become more fully apparent from the description hereinafter set forth of one embodiment or example of the invention, together with a modification thereof, having reference to the accompanying drawings. Of the drawings:

Fig. I represents a fragmentary side elevation of my improved flexible drive applied to a locomotive driving gear center, with certain parts shown in cross section, and illustrates the manner in which the resilient drive units coact with parts of the driving wheel of the locomotive.

Fig. II represents a cross section of the same, taken as indicated by the lines II—II of Fig. I.

Fig. III represents a fragmentary view somewhat similar to Fig. I, but showing an alternative method of applying the resilient drive units to the arm carried on the driving gear center.

Fig. IV represents a view showing the same parts illustrated in Fig. III, but with the spacing rings moved to a different position to compensate for wear.

Fig. V represents a perspective view of one of the locking rings used for maintaining the resilient drive units in fixed position within their supporting holders; and, Fig. VI represents an enlarged cross sectional view, taken as indicated by the lines VI—VI of Fig. II, showing the manner in which the locking ring is affixed to the holder.

This invention, although it may be applied to various types of drives, is particularly applicable to electric locomotives which have the main driving motors positioned on the main frame of the locomotive, and the torque of the motors delivered through flexible means to the driving wheels. In thus applying this new flexible driving gear to a modern electric locomotive, no change is contemplated in the main driving motors, main frame of the locomotive, quill, or gears that transfer the motor torque to the driving unit, but the change in design is confined to the character of the connecting unit disposed between the driving gear and the driving wheels.

With reference to Figs. I and II of the drawings, there is shown a locomotive driving wheel 8, which is mounted upon an axle 9. Surrounding the axle 9 there is a quill 10, upon which is mounted a gear center 11, the gear center having gears 12 at its periphery and being housed within a gear case 13. It may be assumed that the quill 10 is driven by an electric motor. Sufficient clearance is provided between the axle 9 and quill 10 to allow for considerable relative movement between these parts and thus to take care of spring deflection. The gear center 11 is further provided with a plurality of raised machined faces 14, upon each of which a driving arm 15 is positioned and held securely on the gear center by a plurality of machined and fitted bolts 16.

Each driving arm 15 includes a cylindrically shaped holder 5, with an inwardly projecting flange 6 at one end thereof and arcuate slots 7 at the opposite end. The connecting units for transmitting the torque of the gear center 11 to the locomotive driving wheel 8 are comprehensively designated at 17. Each such unit consists of a pair of counterpart resilient moulded rubber pieces 4 of substantially plug-shaped formation. Each rubber element 4 has a cylindrical base portion 18 and a cylindrical cantilever neck portion 19 through which the driving load is transmitted to pads 20 positioned adjacent to the openings between the spokes 21 of the driving wheels 8. The rubber elements 4 of each pair are spaced back to back and are adapted to abut against each other as clearly shown in Fig. I of the drawings. On the base 18 of each rubber element 4, there is a circular metal disc 22 to which the base is vulcanized along the surface 23, while on the opposite surface 24 of this disc the neck portion 19 is also vulcanized. The rubber elements 4 of the drive units 17, when in operative position on a locomotive, are in alignment with each other with their axes disposed substantially at right angles to the pads 20. The free elongated ends of each pair of rubber elements 4 engage the oppositely disposed pads 20 at each side of the opening within which the drive unit is positioned. In an obvious manner, when the motor and the gear center 11 rotate in one direction the drive units 17 will engage the pads 20 at one side of the openings between the spokes 21, whereas when the motor and gear center revolve in the opposite direction the drive units will engage the pads at the opposite side of the opening between the spokes.

In the assembly of this new driving unit, a holding ring 26 is first placed in position within the holder 5 with its ledge 27 engaging the inwardly projecting flange 6. Then the two rubber elements 4 are positioned with their bases 18 in proximate relation to each other within the holder 5, and their neck portions 19 protruding toward the pads 20 on the wheel spokes 21. The rubber elements 4 being thus positioned within the holder 5, a locking ring 31 is inserted. Details of the locking ring 31 are shown clearly in the perspective view of Fig. V. The ring has thereon a number of radially projecting lugs 32 which are adapted to be received in the arcuate slots 7 of the holder 5. To insert the locking ring 31 the projecting lugs 32 are aligned in registry with the slots 7. The locking ring 31 is then pressed inwardly within the holder 5 and rotated until the projections 32 are in positions behind the ledge 34 of the holder 5. The locking ring 31 being thus placed in position is securely locked therein by means of a number of tap bolts 35 which engage threaded openings 36 in the holder 5 and openings 37 in the locking ring 31, as shown most clearly in Fig. VI. The tap bolts 35 are held against rotation after their insertion by means of a wire 38 applied in the manner shown most clearly in Fig. I, or by any other suitable means. With the parts thus assembled within the holder 5, the entire assembly associated driving arm 15 can be readily applied to the gear center 14 by means of the bolts 16 after which the unit is in readiness for operation.

In Fig. III, there is shown a modified form of the invention, in which no change is made in the construction of the arm 15 and its cylindrical holder 5, and no change is made in the construction of the rubber elements 4; but a plurality of rings are interposed in surrounding relation to the rubber elements 4. More specifically in this example, base rings 30 are interposed adjacent to the disc portions 22 of the rubber elements 4, and additional rings 29, serving as spacing rings, are placed between the base rings 30 and the holding ring 26 at one end of the unit and between the base ring 30 and the locking ring 31 at the other end of the unit. When this construction is utilized, as wear takes place the rubber elements 4 may be readjusted to compensate for such wear by changing the position of one or more of the spacing rings 29 to suit the existing condition. Such an adjustment is illustrated in Fig. IV, wherein one of the spacing rings 29 has been moved to a position intermediate the bases 18 of the rubber elements 4. When the spacing rings 29 are thus shifted, it is desirable to utilize solid discs 39 which are placed between the base sections 18 of the rubber elements 4 and the spacing rings 29 in order to properly maintain the shape of the rubber elements.

In the examples illustrated above, it will be noted that the neck portions 19 of the rubber elements 4 do not fit snugly within the holding rings 26 and locking rings 31, thus providing a housing around the rubber element 4 separated from the element 4 by an annular space. This annular space is provided for two primary reasons: firstly, because it permits the elongated neck portions 19 of the rubber elements 4 to act as cantilevers, thus providing for the requisite flexibility under bending or shearing stresses to permit the locomotive driving wheel 8 to follow uneven track while the locomotive frame to which the gear center 14 is indirectly attached virtually bridges over the unevenness of the track; and secondly, because when starting heavy trains the drive unit 17 tends to recede and enlarge, and in its enlarged form the neck portions 19 of the rubber elements 4 substantially fill the space within the holder 5, thus supporting the rubber elements and decreasing the cantilever action which results in an increase of the life of the drive unit.

It will be apparent that the resilient drive units herein described and illustrated are of very simple and inexpensive construction, and that the rubber elements may be applied, adjusted or replaced very easily as occasion demands. The construction is none the less dependable and efficient and serves to produce a flexible drive having many advantages over the drives now in common use.

Throughout this specification the wheels of the locomotive which engage the rails have been referred to as the "driving wheels", because they serve to drive the locomotive, but such wheels are in reality the driven members of the combination of elements described and illustrated herein, and they are referred to as such in the claims which follow.

While I have described an example of my invention, together with a modification thereof, it will be apparent to those skilled in the art that various other changes and modifications may be made without departing from the spirit or scope of the invention as defined in the annexed claims, and it will also be apparent that the invention is not confined in its application to use with a quill drive for electric locomotives.

Having thus described my invention, I claim:

1. A flexible drive comprising a holder, a driving unit formed of a resilient material and having a base portion and a neck portion, said base portion being mounted in said holder with said neck portion projecting therefrom, the diameter of said neck portion being substantially less than the internal diameter of the portion of said holder extending around said neck portion, and a driven member with which said driving unit contacts in driving.

2. A flexible drive comprising a holder, a driving unit formed of a resilient material and having a base portion and a neck portion of less diameter than said base portion, said base portion being mounted in said holder, a holding ring attached to said holder and having an internal diameter which is substantially less than that of said base portion but substantially greater than that of said neck portion whereby said driving unit may flex fully within defined limits, and a driven unit with which said driving unit contacts in driving.

3. The invention of claim 2, characterized further by the fact that said base portion has a stiff disc-like outer face to which said neck portion is joined integrally.

4. A flexible drive comprising a holder, a driving unit mounted in said holder and having a base portion and a neck portion both formed of resilient material, said base portion having a non-resilient disc-like face on which said neck portion is mounted integrally, a holding ring secured to said holder and extending around said neck portion, said ring having an internal diameter substantially greater than that of said neck portion but substantially less than that of said base portion, and a driven unit with which said drive unit contacts in driving.

5. A flexible drive unit comprising a holder, a pair of drive units made of a resilient material and each consisting of a base portion and a neck portion, said units being mounted in said holder with their base portions contacting, holding rings attached to said holder and extending around said neck portions, each said holding ring having an internal diameter greater than that of said neck portions and less than that of said base portion, and driven units with which said drive units contact in driving.

6. The invention of claim 5 characterized further by the fact that each said base portion has an outer disc-like face made of a non-resilient material on which each said neck portion is integrally mounted.

NORMAN E. GEE.